United States Patent
Lei et al.

(10) Patent No.: US 11,247,945 B2
(45) Date of Patent: Feb. 15, 2022

(54) ADHESIVE FOR MOSS

(71) Applicants: CHENGDU INSTITUTE OF BIOLOGY, CHINESE ACADEMY OF SCIENCES, Sichuan (CN); Southwest University of Science and Technology, Sichuan (CN)

(72) Inventors: Yanbao Lei, Sichuan (CN); Geng Sun, Sichuan (CN); Dalin Zhu, Sichuan (CN); Ke Chen, Sichuan (CN); Yingxin Xue, Sichuan (CN)

(73) Assignees: Chengdu Institute of Biology, Chinese Academy of Sciences, Sichuan (CN); Southwest University of Science and Technology, Sichuan (CN)

( * ) Notice: Subject to any disclaimer, the term of this patent is extended or adjusted under 35 U.S.C. 154(b) by 0 days.

(21) Appl. No.: 17/381,185

(22) Filed: Jul. 20, 2021

(65) Prior Publication Data

US 2021/0347706 A1  Nov. 11, 2021

(30) Foreign Application Priority Data

Aug. 19, 2020 (CN) .......................... 202010837456.9

(51) Int. Cl.
| | | |
|---|---|---|
| *C05G 5/27* | (2020.01) | |
| *C04B 7/345* | (2006.01) | |
| *C04B 7/36* | (2006.01) | |
| *C05G 1/00* | (2006.01) | |
| *C05D 1/00* | (2006.01) | |
| *C05F 11/00* | (2006.01) | |

(52) U.S. Cl.
CPC ............... *C05G 5/27* (2020.02); *C04B 7/345* (2013.01); *C04B 7/36* (2013.01); *C05D 1/00* (2013.01); *C05F 11/00* (2013.01); *C05G 1/00* (2013.01)

(58) Field of Classification Search
None
See application file for complete search history.

(56) References Cited

U.S. PATENT DOCUMENTS

| | | | | | |
|---|---|---|---|---|---|
| 5,112,400 | A | * | 5/1992 | Nae | C08L 1/284 106/197.01 |
| 5,366,767 | A | * | 11/1994 | Howard | C09D 5/1656 106/15.05 |
| 5,531,822 | A | * | 7/1996 | Morizane | C04B 41/5089 106/286.1 |
| 5,589,229 | A | * | 12/1996 | Howard | C09D 5/1656 106/15.05 |

FOREIGN PATENT DOCUMENTS

| | | |
|---|---|---|
| CN | 107896919 A | 4/2018 |
| CN | 110373131 A | 10/2019 |
| CN | 111512840 A | 8/2020 |

OTHER PUBLICATIONS

Chi, Yujie; Food Additives; China Light Industry Press, Edition 1, p. 136-138, Apr. 2013; ISBN: 9787501988013.

* cited by examiner

*Primary Examiner* — Wayne A Langel

(57) ABSTRACT

An adhesive for moss and a method for preparing the adhesive are provided, wherein the method includes steps of: adding melamine, urea, attapulgite and sepiolite powder into a ball milling tank, and adding milling balls into the ball milling tank for ball milling; then collecting ball-milled materials; adding konjac glucomannan, chitosan and collagen into water and stirring, wherein during stirring, half of the ball-milled materials are added into the water; then adding latex powder, stearic acid and ammonium zirconium carbonate, and stirring, wherein during stirring, the other half of the ball-milled materials are added into the water. The adhesive for moss can be used for bonding moss with sufficient bonding effect, which is environment-friendly and will not harm the moss; meanwhile, the konjac glucomannan, the chitosan, the collagen attapulgite and the sepiolite powder which are contained in the adhesive can provide nutrition for the moss.

4 Claims, No Drawings

ADHESIVE FOR MOSS

CROSS REFERENCE OF RELATED APPLICATION

The present invention claims priority under 35 U.S.C. 119(a-d) to CN 202010837456.9, filed Aug. 19, 2020.

BACKGROUND OF THE PRESENT INVENTION

Field of Invention

The present invention relates to a technical field of environmental engineering, and more particularly to an adhesive for moss.

Description of Related Arts

With the development of economy, the greening and beautifying of the homeland have become the higher living pursuits of people. Exposed rock slopes on both sides of a highway or a railway and exposed pits after mining are greening objects which are mainly concerned by people. The exposed rock is not covered by soil, and the environment is extremely harsh, so the environment will not be changed for years or even decades without manual intervention. Conventionally, a large amount of exposed rocks exist due to facts such as natural environment, ore mining and urban construction, which not only affect urban landscapes, but also cause water and soil loss as well as limit regional development. According to the prior art, rock greening is realized by measures such as net hanging, soil dressing, overhanging plants, and climbing plants. However, most greening measures are either short-lasting or insufficient. Furthermore, some slopes can be instable due to plant roots, leading to geological disasters.

Moss can green on the rock, so as to solve the greening problem of the rock side slope and the like. Moss is short and small in individuals, simple in morphological structure, free of real root system, and limited in regulation and control capacity on water diversion. However, due to special structures and physiological adaptation mechanisms, moss can grow and propagate in extreme environments where other terrestrial plants are difficult to live, such as high temperature, drought, extremely cold environment, freezing environment and weak light. Many varieties of the small plants are pioneer species in the primary succession stage, which are usually clustered in open, barren and mostly non-survival places for vascular plants, particularly in areas with a large amount of exposed rocks. In such areas, other plants cannot grow, and the moss has unique advantages. With the development of moss greening engineering, the defects of processing technology and engineering construction technology for moss materials are increasingly highlighted, and the problem of lacking matched processing technology and standard products is urgently to be solved. When it comes to fixing moss materials, the adhesives adopted are products commonly used in fields such as aquarium landscaping and engineering construction, including quick-drying glue and white latex. The application range of such products is limited, and some of them have pungent smell or contain toxic and harmful components. In addition, such adhesives cannot resist wind blowing when applied outdoors, which means poor adhesion effect on moss.

SUMMARY OF THE PRESENT INVENTION

An object of the present invention is to solve at least the above problems and/or disadvantages, and to provide at least the advantages described hereinafter.

Accordingly, in order to accomplish the above objects, the present invention provides an adhesive for moss, comprising: 50-100 parts by weight of konjac glucomannan, 50-100 parts by weight of chitosan, 50-100 parts by weight of collagen, 40-60 parts by weight of latex powder, 10-30 parts by weight of stearic acid, 5-15 parts by weight of ammonium zirconium carbonate, 10-30 parts by weight of melamine, 10-20 parts by weight of urea, 60-90 parts by weight of attapulgite, 50-80 parts by weight of sepiolite powder, and 200-300 parts by weight of water.

Preferably, the adhesive comprises: 80 parts by weight of konjac glucomannan, 80 parts by weight of chitosan, 80 parts by weight of collagen, 50 parts by weight of latex powder, 20 parts by weight of stearic acid, 10 parts by weight of ammonium zirconium carbonate, 20 parts by weight of melamine, 15 parts by weight of urea, 80 parts by weight of attapulgite, 70 parts by weight of sepiolite powder, and 245 parts by weight of water.

Preferably, the latex powder is selected from a group consisting of acrylic resin, vinyl acetate homopolymerized powder, and copolymer powder of vinyl acetate and ethylene.

Preferably, the collagen is a modified collagen, which is prepared by steps of: adding 50-100 parts by weight of collagen into 1000-1200 parts by weight of water, performing ultrasonic treatment for 30-45 min, adding 5-8 parts by weight of theanine, continuing ultrasonic treatment for 15-30 min, then adding 15-25 parts by weight of poly-L-glutamic acid, heating to 45-60° C., placing under ultraviolet lamp light irradiation, reacting for 15-30 min while stirring, and performing centrifugal separation to obtain the modified collagen.

Preferably, an ultrasonic power is 80-120 W, and an ultrasonic frequency is 30-50 kHz; a power of the ultraviolet lamp light irradiation is 50-500 W, and a wavelength of the ultraviolet lamp light irradiation is 220-400 nm.

Preferably, the sepiolite powder is modified sepiolite powder, which is prepared by steps of: adding sepiolite powder into a potassium ferrate solution, heating to 45-60° C., performing ultrasonic treatment for 60-90 min, then adding a nitric acid solution and stirring for 15-30 min, filtering and washing with deionized water until a pH value of a filtrate is equal to a pH value of the deionized water, drying a solid product before performing irradiation treatment with a high-energy electron beam to obtain the modified sepiolite powder.

Preferably, a mass-volume ratio of the sepiolite powder to the potassium ferrate solution is 18-25 g/L; a concentration of the potassium ferrate solution is 0.5-0.8 mol/L; a concentration of the nitric acid solution is 0.5-1 mol/L; a volume ratio of the potassium ferrate solution to the nitric acid solution is 1:0.01-0.02; an energy of the high-energy electron beam is 5-10 MeV, and a dosage is 10-40 kGy.

The present invention also provides a method for preparing the adhesive, comprising steps of:

1) adding melamine, urea, attapulgite and sepiolite powder into a ball milling tank according to parts by weight, and adding milling balls into the ball milling tank; adding liquid nitrogen into the ball milling tank to immerse the melamine, the urea, the attapulgite and the sepiolite powder at a temperature of −160° C. to −175° C., wherein a volatilization rate of the liquid nitrogen is equal to an adding amount of the liquid nitrogen to maintain a liquid level; keeping the temperature for 15 min before ball milling for 30-45 min; then transferring the ball milling tank into a vacuum glove box, waiting for 3-5 hours, and collecting ball-milled materials; and 2) adding konjac glucomannan, chitosan and collagen into water according to parts by weight, and stirring for 30-60 min at a speed of 1000-1200 r/min, wherein during stirring, half of the ball-milled materials are added into the water at a rate of 10-30 parts/min; then adding latex powder, stearic acid and ammonium zirconium carbonate, and stirring for 30-45 min at a speed of 1000-1200 r/min, wherein during stirring, the other half of the ball-milled materials are added into the water at a rate of 10-30 parts/min to obtain the adhesive for moss.

The present invention has at least the following beneficial effects: the special adhesive for moss is used for bonding moss with sufficient bonding effect, which is environment-friendly and will not harm the moss; meanwhile, the konjac glucomannan, the chitosan, the collagen attapulgite and the sepiolite powder which are contained in the adhesive can provide nutrition for the moss as well as provide thickening, thixotropic and water-retaining effects, so that the adhesive force and air permeability of the adhesive can be improved; the adhesive can promote the rapid planting of the moss in severe environments such as exposed rocks, broken stones, fallen woods and bare grounds.

Additional advantages, objects, and features of the present invention will be further illustrated follow, and can be understood by those skilled in the art through research and practice of the present invention.

DETAILED DESCRIPTION OF THE PREFERRED EMBODIMENT

The present invention will be further described with reference to embodiments, so as to facilitate practicing the present invention by those skilled in the art.

It will be understood that terms such as "having," "including," and "comprising" as used herein do not exclude the presence or addition of one or more other elements or combinations thereof.

Adhesives for moss prepared in embodiments 1-7 were subjected to performance detection, wherein tensile shear strengths were determined according to Chinese standard GB/T7124-2008 and peel strengths were determined according to Chinese standard GB/T2791-1995.

Embodiment 1

An adhesive for moss comprises: 50 g konjac glucomannan, 50 g chitosan, 50 g collagen, 40 g ethylene-vinyl acetate copolymer latex powder, 10 g stearic acid, 5 g ammonium zirconium carbonate, 10 g melamine, 10 g urea, 60 g attapulgite, 50 g sepiolite powder, and 200 g water.

A method for preparing the adhesive comprises steps of:

1) adding melamine, urea, attapulgite and sepiolite powder into a ball milling tank according to the above weights, and adding milling balls into the ball milling tank; adding liquid nitrogen into the ball milling tank to immerse the melamine, the urea, the attapulgite and the sepiolite powder at a temperature of −160° C., wherein a volatilization rate of the liquid nitrogen is equal to an adding amount of the liquid nitrogen to maintain a liquid level; keeping the temperature for 15 min before ball milling for 30 min; then transferring the ball milling tank into a vacuum glove box, waiting for 3 hours, and collecting ball-milled materials; and 2) adding konjac glucomannan, chitosan and collagen into water according to the above weights, and stirring for 30 min at a speed of 1000 r/min, wherein during stirring, half of the ball-milled materials are added into the water at a rate of 10 g/min; then adding latex powder, stearic acid and ammonium zirconium carbonate, and stirring for 30 min at a speed of 1000 r/min, wherein during stirring, the other half of the ball-milled materials are added into the water at a rate of 10 g/min to obtain the adhesive for moss.

According to the embodiment 1, the tensile shear strength of the adhesive was 10.5 Mpa; and the peel strength was 11.6 N/mm.

Embodiment 2

An adhesive for moss comprises: 100 g konjac glucomannan, 100 g chitosan, 100 g collagen, 60 g ethylene-vinyl acetate copolymer latex powder, 30 g stearic acid, 15 g ammonium zirconium carbonate, 30 g melamine, 20 g urea, 90 g attapulgite, 80 g sepiolite powder, and 300 g water.

A method for preparing the adhesive comprises steps of:

1) adding melamine, urea, attapulgite and sepiolite powder into a ball milling tank according to the above weights, and adding milling balls into the ball milling tank; adding liquid nitrogen into the ball milling tank to immerse the melamine, the urea, the attapulgite and the sepiolite powder at a temperature of −175° C., wherein a volatilization rate of the liquid nitrogen is equal to an adding amount of the liquid nitrogen to maintain a liquid level; keeping the temperature for 15 min before ball milling for 45 min; then transferring the ball milling tank into a vacuum glove box, waiting for 3 hours, and collecting ball-milled materials; and 2) adding konjac glucomannan, chitosan and collagen into water according to the above weights, and stirring for 60 min at a speed of 1200 r/min, wherein during stirring, half of the ball-milled materials are added into the water at a rate of 30 g/min; then adding latex powder, stearic acid and ammonium zirconium carbonate, and stirring for 30 min at a speed of 1200 r/min, wherein during stirring, the other half of the ball-milled materials are added into the water at a rate of 30 g/min to obtain the adhesive for moss.

According to the embodiment 2, the tensile shear strength of the adhesive was 10.7 Mpa; and the peel strength was 11.8 N/mm.

Embodiment 3

An adhesive for moss comprises: 80 g konjac glucomannan, 78 g chitosan, 75 g collagen, 55 g ethylene-vinyl acetate copolymer latex powder, 25 g stearic acid, 12 g ammonium zirconium carbonate, 18 g melamine, 15 g urea, 75 g attapulgite, 72 g sepiolite powder, and 245 g water.

A method for preparing the adhesive comprises steps of:

1) adding melamine, urea, attapulgite and sepiolite powder into a ball milling tank according to the above weights, and adding milling balls into the ball milling tank; adding liquid nitrogen into the ball milling tank to immerse the melamine, the urea, the attapulgite and the sepiolite powder at a temperature of −170° C., wherein a volatilization rate of the liquid nitrogen is equal to an adding amount of the liquid nitrogen to maintain a liquid level; keeping the temperature for 15 min before ball milling for 40 min; then transferring the ball milling tank into a vacuum glove box, waiting for 3 hours, and collecting ball-milled materials; and 2) adding konjac glucomannan, chitosan and collagen into water according to the above weights, and stirring for 60 min at a speed of 1200 r/min, wherein during stirring, half of the ball-milled materials are added into the water at a rate of 20 g/min; then adding latex powder, stearic acid and ammonium zirconium carbonate, and stirring for 30 min at a speed of 1200 r/min, wherein during stirring, the other half of the ball-milled materials are added into the water at a rate of 20 g/min to obtain the adhesive for moss.

According to the embodiment 3, the tensile shear strength of the adhesive was 10.6 Mpa; and the peel strength was 11.8 N/mm.

Embodiment 4

An adhesive for moss comprises: 85 g konjac glucomannan, 75 g chitosan, 70 g collagen, 55 g copolymer powder of acrylic ester and styrene, 30 g stearic acid, 15 g ammonium zirconium carbonate, 30 g melamine, 20 g urea, 90 g attapulgite, 80 g sepiolite powder, and 245 g water.

A method for preparing the adhesive comprises steps of:

1) adding melamine, urea, attapulgite and sepiolite powder into a ball milling tank according to the above weights, and adding milling balls into the ball milling tank; adding liquid nitrogen into the ball milling tank to immerse the melamine, the urea, the attapulgite and the sepiolite powder at a temperature of −175° C., wherein a volatilization rate of the liquid nitrogen is equal to an adding amount of the liquid nitrogen to maintain a liquid level; keeping the temperature for 15 min before ball milling for 45 min; then transferring the ball milling tank into a vacuum glove box, waiting for 3 hours, and collecting ball-milled materials; and 2) adding konjac glucomannan, chitosan and collagen into water according to the above weights, and stirring for 60 min at a speed of 1200 r/min, wherein during stirring, half of the ball-milled materials are added into the water at a rate of 25 g/min; then adding latex powder, stearic acid and ammonium zirconium carbonate, and stirring for 30 min at a speed of 1200 r/min, wherein during stirring, the other half of the ball-milled materials are added into the water at a rate of 25 g/min to obtain the adhesive for moss.

According to the embodiment 4, the tensile shear strength of the adhesive was 11.1 Mpa; and the peel strength was 12.2 N/mm.

Embodiment 5

An adhesive for moss comprises: 80 g konjac glucomannan, 78 g chitosan, 75 g modified collagen, 55 g ethylene-vinyl acetate copolymer latex powder, 25 g stearic acid, 12 g ammonium zirconium carbonate, 18 g melamine, 15 g urea, 75 g attapulgite, 72 g sepiolite powder, and 245 g water.

A method for preparing the adhesive comprises steps of:

1) adding melamine, urea, attapulgite and sepiolite powder into a ball milling tank according to the above weights, and adding milling balls into the ball milling tank; adding liquid nitrogen into the ball milling tank to immerse the melamine, the urea, the attapulgite and the sepiolite powder at a temperature of −170° C., wherein a volatilization rate of the liquid nitrogen is equal to an adding amount of the liquid nitrogen to maintain a liquid level; keeping the temperature for 15 min before ball milling for 40 min; then transferring the ball milling tank into a vacuum glove box, waiting for 3 hours, and collecting ball-milled materials; and 2) adding konjac glucomannan, chitosan and collagen into water according to the above weights, and stirring for 60 min at a speed of 1200 r/min, wherein during stirring, half of the ball-milled materials are added into the water at a rate of 20 g/min; then adding latex powder, stearic acid and ammonium zirconium carbonate, and stirring for 30 min at a speed of 1200 r/min, wherein during stirring, the other half of the ball-milled materials are added into the water at a rate of 20 g/min to obtain the adhesive for moss.

The modified collagen is prepared by steps of: adding 80 g collagen into 1000 g water, performing ultrasonic treatment for 45 min, adding 8 g theanine, continuing ultrasonic treatment for 30 min, then adding 20 g poly-L-glutamic acid, heating to 60° C., placing under ultraviolet lamp light irradiation, reacting for 30 min while stirring, and performing centrifugal separation to obtain the modified collagen; wherein an ultrasonic power is 120 W, and an ultrasonic frequency is 50 kHz; a power of the ultraviolet lamp light irradiation is 300 W, and a wavelength of the ultraviolet lamp light irradiation is 254 nm. The collagen is modified, and the catechin and the poly-L-glutamic acid react with the collagen, thereby forming intramolecular and intermolecular cross-linking. The cross-linking bonds are intertwined to form a dense net-shaped structure, which greatly improves the molecular cohesion, thereby improving the strength of the adhesive.

According to the embodiment 5, the tensile shear strength of the adhesive was 12.7 Mpa; and the peel strength was 13.5 N/mm.

Embodiment 6

An adhesive for moss comprises: 80 g konjac glucomannan, 78 g chitosan, 75 g collagen, 55 g ethylene-vinyl acetate copolymer latex powder, 25 g stearic acid, 12 g ammonium zirconium carbonate, 18 g melamine, 15 g urea, 75 g attapulgite, 72 g modified sepiolite powder, and 245 g water.

A method for preparing the adhesive comprises steps of:

1) adding melamine, urea, attapulgite and sepiolite powder into a ball milling tank according to the above weights, and adding milling balls into the ball milling tank; adding liquid nitrogen into the ball milling tank to immerse the melamine, the urea, the attapulgite and the sepiolite powder at a temperature of −170° C., wherein a volatilization rate of the liquid nitrogen is equal to an adding amount of the liquid nitrogen to maintain a liquid level; keeping the temperature for 15 min before ball milling for 40 min; then transferring the ball milling tank into a vacuum glove box, waiting for 3 hours, and collecting ball-milled materials; and 2) adding konjac glucomannan, chitosan and collagen into water according to the above weights, and stirring for 60 min at a speed of 1200 r/min, wherein during stirring, half of the ball-milled materials are added into the water at a rate of 20 g/min; then adding latex powder, stearic acid and ammonium zirconium carbonate, and stirring for 30 min at a speed of 1200 r/min, wherein during stirring, the other half of the ball-milled materials are added into the water at a rate of 20 g/min to obtain the adhesive for moss.

The modified sepiolite powder is prepared by steps of: adding 25 g sepiolite powder into 1 L potassium ferrate solution, heating to 60° C., performing ultrasonic treatment for 90 min, then adding a nitric acid solution and stirring for 30 min, filtering and washing with deionized water until a pH value of a filtrate is equal to a pH value of the deionized water, drying a solid product before performing irradiation treatment with a high-energy electron beam to obtain the modified sepiolite powder; wherein a concentration of the potassium ferrate solution is 0.6 mol/L; a concentration of the nitric acid solution is 0.5 mol/L; a volume ratio of the potassium ferrate solution to the nitric acid solution is 1:0.01; an energy of the high-energy electron beam is 8 MeV, and a dosage is 35 kGy. The sepiolite powder is modified, so that the surface porosity and surface functional groups of the sepiolite are increased. Therefore, dispersibility of the sepiolite in the adhesive is enhanced, so as to improve mechanical strength of the obtained adhesive for moss.

According to the embodiment 6, the tensile shear strength of the adhesive was 14.8 Mpa; and the peel strength was 15.7 N/mm.

Embodiment 7

An adhesive for moss comprises: 80 g konjac glucomannan, 78 g chitosan, 75 g modified collagen, 55 g ethylene-vinyl acetate copolymer latex powder, 25 g stearic acid, 12 g ammonium zirconium carbonate, 18 g melamine, 15 g urea, 75 g attapulgite, 72 g modified sepiolite powder, and 245 g water.

A method for preparing the adhesive comprises steps of:

1) adding melamine, urea, attapulgite and sepiolite powder into a ball milling tank according to the above weights, and adding milling balls into the ball milling tank; adding liquid nitrogen into the ball milling tank to immerse the melamine, the urea, the attapulgite and the sepiolite powder at a temperature of −170° C., wherein a volatilization rate of the liquid nitrogen is equal to an adding amount of the liquid nitrogen to maintain a liquid level; keeping the temperature for 15 min before ball milling for 40 min; then transferring the ball milling tank into a vacuum glove box, waiting for 3 hours, and collecting ball-milled materials; and 2) adding konjac glucomannan, chitosan and collagen into water according to the above weights, and stirring for 60 min at a speed of 1200 r/min, wherein during stirring, half of the ball-milled materials are added into the water at a rate of 20 g/min; then adding latex powder, stearic acid and ammonium zirconium carbonate, and stirring for 30 min at a speed of 1200 r/min, wherein during stirring, the other half of the ball-milled materials are added into the water at a rate of 20 g/min to obtain the adhesive for moss.

The modified collagen is prepared by steps of: adding 80 g collagen into 1000 g water, performing ultrasonic treatment for 45 min, adding 8 g theanine, continuing ultrasonic treatment for 30 min, then adding 20 g poly-L-glutamic acid, heating to 60° C., placing under ultraviolet lamp light irradiation, reacting for 30 min while stirring, and performing centrifugal separation to obtain the modified collagen; wherein an ultrasonic power is 120 W, and an ultrasonic frequency is 50 kHz; a power of the ultraviolet lamp light irradiation is 300 W, and a wavelength of the ultraviolet lamp light irradiation is 254 nm.

The modified sepiolite powder is prepared by steps of: adding 25 g sepiolite powder into 1 L potassium ferrate solution, heating to 60° C., performing ultrasonic treatment for 90 min, then adding a nitric acid solution and stirring for 30 min, filtering and washing with deionized water until a pH value of a filtrate is equal to a pH value of the deionized water, drying a solid product before performing irradiation treatment with a high-energy electron beam to obtain the modified sepiolite powder; wherein a concentration of the potassium ferrate solution is 0.6 mol/L; a concentration of the nitric acid solution is 0.5 mol/L; a volume ratio of the potassium ferrate solution to the nitric acid solution is 1:0.01-0.02; an energy of the high-energy electron beam is 8 MeV, and a dosage is 35 kGy.

According to the embodiment 7, the tensile shear strength of the adhesive was 15.7 Mpa; and the peel strength was 17.6 N/mm.

Although the embodiments of the present invention have been described above, applications of the present invention are not limited to the description and the embodiments. The present invention is fully applicable to various possible fields. To those skilled in the art, the present invention may be embodied with additional modifications. Therefore, without departing from the generic concept as defined by the claims and their equivalents, the present invention is not limited to the details and the embodiments described above.

What is claimed is:

1. An adhesive for moss, comprising: 80 parts by weight of konjac glucomannan, 80 parts by weight of chitosan, 80 parts by weight of modified collagen, 50 parts by weight of latex powder, 20 parts by weight of stearic acid, 10 parts by weight of ammonium zirconium carbonate, 20 parts by weight of melamine, 15 parts by weight of urea, 80 parts by weight of attapulgite, 70 parts by weight of sepiolite powder, and 245 parts by weight of water;

wherein the redispersible latex powder is selected from a group consisting of ethylene-vinyl acetate copolymer latex powder, copolymer powder of vinyl acetate and higher fatty acid vinyl ester, copolymer powder of acrylic ester and styrene, terpolymer powder of vinyl acetate, ethylene and higher fatty acid vinyl ester, and terpolymer powder of vinyl acetate, acrylic ester and higher fatty acid vinyl ester;

wherein the modified collagen is prepared by steps of: adding 50-100 parts by weight of collagen into 1000-1200 parts by weight of water, performing ultrasonic treatment for 30-45 min, adding 5-8 parts by weight of theanine, continuing ultrasonic treatment for 15-30 min, then adding 15-25 parts by weight of poly-L-glutamic acid, heating to 45-60° C., placing under ultraviolet lamp light irradiation, reacting for 15-30 min while stirring, and performing centrifugal separation to obtain the modified collagen;

wherein an ultrasonic power is 80-120W, and an ultrasonic frequency is 30-50 kHz; a power of the ultraviolet lamp light irradiation is 50-500W, and a wavelength of the ultraviolet lamp light irradiation is 220-400 nm.

2. The adhesive, as recited in claim 1, wherein the sepiolite powder is modified sepiolite powder, which is prepared by steps of: adding sepiolite powder into a potassium ferrate solution, heating to 45-60° C., performing ultrasonic treatment for 60-90 min, then adding a nitric acid solution and stirring for 15-30 min, filtering and washing with deionized water until a pH value of a filtrate is equal to a pH value of the deionized water, drying a solid product before performing irradiation treatment with a high-energy electron beam to obtain the modified sepiolite powder.

3. The adhesive, as recited in claim 2, wherein a mass-volume ratio of the sepiolite powder to the potassium ferrate solution is 18-25 g/L; a concentration of the potassium ferrate solution is 0.5-0.8 mol/L; a concentration of the nitric acid solution is 0.5-1 mol/L; a volume ratio of the potassium ferrate solution to the nitric acid solution is 1: 0.01-0.02; an energy of the high-energy electron beam is 5-10 MeV, and a dosage is 10-40 kGy.

4. A method for preparing the adhesive as recited in claim 1, comprising steps of:

1) adding melamine, urea, attapulgite and sepiolite powder into a ball milling tank according to parts by weight, and adding milling balls into the ball milling tank; adding liquid nitrogen into the ball milling tank to immerse the melamine, the urea, the attapulgite and the sepiolite powder at a temperature of −160° C. to −175° C., wherein a volatilization rate of the liquid nitrogen is equal to an adding amount of the liquid nitrogen to maintain a liquid level; keeping the temperature for 15 min before ball milling for 30-45 min; then transferring the ball milling tank into a vacuum glove box, waiting for 3-5 hours, and collecting ball-milled materials; and
2) adding konjac glucomannan, chitosan and modified collagen into water according to parts by weight, and stirring for 30-60 min at a speed of 1000-1200 r/min, wherein during stirring, half of the ball-milled materials are added into the water at a rate of 10-30 parts/min; then adding latex powder, stearic acid and ammonium zirconium carbonate, and stirring for 30-45 min at a speed of 1000-1200 r/min, wherein during stirring, the other half of the ball-milled materials are added into the water at a rate of 10-30 parts/min to obtain the adhesive for moss.

* * * * *